United States Patent
Lee

(10) Patent No.: US 7,385,434 B2
(45) Date of Patent: Jun. 10, 2008

(54) CIRCUIT FOR PREVENTING LATCH-UP IN DC-DC CONVERTER

(75) Inventor: Chung-Heon Lee, Cheongju-si (KR)

(73) Assignee: Magnachip Semiconductor Ltd., Cheongju-si (KR)

( * ) Notice: Subject to any disclaimer, the term of this patent is extended or adjusted under 35 U.S.C. 154(b) by 0 days.

(21) Appl. No.: 11/321,952

(22) Filed: Dec. 28, 2005

(65) Prior Publication Data

US 2006/0145671 A1    Jul. 6, 2006

(30) Foreign Application Priority Data

Dec. 30, 2004   (KR)  ............... 10-2004-0115903

(51) Int. Cl.
*H03K 3/01*   (2006.01)
(52) U.S. Cl. .............. 327/534; 327/530; 327/545; 327/564
(58) Field of Classification Search ............... 327/534, 327/530, 545, 564, 566
See application file for complete search history.

(56) References Cited

U.S. PATENT DOCUMENTS

| | | | | |
|---|---|---|---|---|
| 5,304,859 A | * | 4/1994 | Arimoto | ............... 327/535 |
| 5,689,209 A | * | 11/1997 | Williams et al. | ............... 327/425 |
| 5,767,733 A | * | 6/1998 | Grugett | ............... 327/534 |
| 6,191,615 B1 | * | 2/2001 | Koga | ............... 326/81 |
| 6,373,479 B1 | * | 4/2002 | Moon | ............... 345/211 |
| 6,377,112 B1 | * | 4/2002 | Rozsypal | ............... 327/534 |

FOREIGN PATENT DOCUMENTS

KR    10-2004-0115903    12/2004

* cited by examiner

*Primary Examiner*—Bao Q Vu
(74) *Attorney, Agent, or Firm*—DLA Piper US LLP

(57) ABSTRACT

There is provided a circuit for preventing latch-up in a DC-DC. The circuit for preventing a latch-up phenomenon in a DC-DC converter, the DC-DC converter having a first and a second DC-DC converters coupled with each other in one chip for receiving an input voltage to generate a positive voltage and a negative voltage, respectively, in which a parasitic block with a PNP transistor and an NPN transistor causing a latch-up phenomenon is embedded, the circuit includes a first pathway for controlling an input current flowing to the first DC-DC converter from an input terminal receiving the input voltage in order that the PNP transistor is turned on and the NPN transistor is not turned on; and a second pathway for supplying the input current to the first DC-DC converter intactly at a timing that both the positive and negative voltages reach target voltages.

10 Claims, 4 Drawing Sheets

CIRCUIT FOR PREVENTING LATCH-UP IN DC-DC CONVERTER

FIELD OF THE INVENTION

The present invention relates to a circuit for preventing latch-up in a DC-DC converter; and, more particularly, to a circuit for preventing latch-up in DC-DC converters which are designed to be coupled with each other in one chip for generating a positive voltage and a negative voltage, respectively.

DESCRIPTION OF RELATED ART

In a semiconductor circuitry, a DC-DC converter is used for receiving a direct current (DC) voltage and converting the DC voltage into another DC voltage. That is, the DC-DC converter converts the DC voltage into a positive DC voltage or a negative DC voltage according to its constitution.

Recently, since both of devices driven by a positive voltage and a negative voltage are implemented within one semiconductor chip, there are employed the DC-DC converter for generating the positive DC voltage as well as the DC-DC converter for generating the negative DC voltage.

FIG. 1 is a block diagram setting forth a conventional DC-DC converter, and FIG. 2 is an operational waveform diagram illustrating normal operational characteristics of the conventional DC-DC converter of FIG. 1.

Referring to FIGS. 1 and 2, the conventional DC-DC converter 10 includes a positive voltage generating unit 11 (hereinafter, referred to as a first DC-DC converter), and a negative voltage generating unit 12 (hereinafter, referred to as a second DC-DC converter). In a normal state, the first DC-DC converter 11 outputs a positive output voltage VPOUT, i.e., a positive DC voltage obtained by multiplying an input voltage VIN by m (i.e., VPOUT=VIN×m), after a first predetermined time, wherein m is an arbitrary number more than 1. Likewise, the second DC-DC converter 12 outputs a negative output voltage VNOUT i.e., a negative DC voltage obtained by multiplying the input voltage VIN by −n (i.e., VNOUT=VIN×−n), after a second predetermined time, wherein n is an integer of 1 or more.

However, there occurs a latch-up phenomenon in the conventional DC-DC converter 10. Thus, as will be illustrated in FIG. 5, the first DC-DC converter 11 outputs the positive output voltage VPOUT in a range of 1.2 V to 1.4 V, while the second DC-DC converter 12 outputs the negative output voltage VNOUT in a range of 0.6 V to 0.7 V. This latch-up phenomenon has a baneful influence upon device characteristics awfully.

A mechanism of the latch-up phenomenon will be set forth with reference to FIGS. 3 and 4 herebelow.

First, there must exist a parasitic latch-up block causing the latch-up phenomenon in the DC-DC converter 10, which is common to both the first and the second DC-DC converters 11 and 12, due to inherency of the CMOS circuit, as shown in a cross sectional view of FIG. 3. Meanwhile, FIG. 4 is an equivalent circuit setting forth the parasitic latch-up block of FIG. 3, in which a current path for causing the latch-up phenomenon is well illustrated.

Before the positive output voltage VPOUT is generated, a forward bias is applied between an input terminal receiving the input voltage VIN and an output terminal (hereinafter, referred to as a first output terminal) outputting the positive output voltage VPOUT. At this time, due to the current flow, a parasitic PNP transistor Q1 is turned on. Accordingly, a current I1 flows into a p-type substrate so that the negative output voltage VNOUT is increased, as illustrated in FIG. 5.

At this time, as the current I1, i.e., the collector current of the PNP transistor Q1 is increased, the negative output voltage VNOUT is continuously increased. Thereafter, when the negative output voltage VNOUT reaches a certain voltage level in a range of 0.6 V to 0.7 V, a forward bias is applied to the PN junction between an output terminal (hereinafter, referred to as a second output terminal) outputting the negative output voltage VNOUT and a ground terminal GND so that an NPN transistor Q2 is turned on. Therefore, a current I2 flows out to the ground terminal GND through the NPN transistor Q2, which results in decreasing the positive output voltage VPOUT. After all, there is inevitably formed the current path causing the latch-up phenomenon according to the conventional DC-DC converter.

SUMMARY OF THE INVENTION

It is, therefore, an object of the present invention to provide a circuit for preventing latch-up in a DC-DC converter where a first and a second DC-DC converters are designed to be coupled with each other in one chip for generating a positive DC voltage and a negative DC voltage, respectively.

In accordance with an aspect of the present invention, there is provided a circuit for preventing a latch-up phenomenon in a DC-DC converter, the DC-DC converter including a first and a second DC-DC converters coupled with each other in one chip for receiving an input voltage to generate a positive voltage and a negative voltage, respectively, in which a parasitic unit with a PNP transistor and an NPN transistor causing a latch-up phenomenon is embedded, the circuit including: a first pathway for controlling an input current flowing to the first DC-DC converter from an input terminal receiving the input voltage in order that the PNP transistor is turned on and the NPN transistor is not turned on; and a second pathway for supplying the input current to the first DC-DC converter intactly at a timing that both the positive and negative voltages reach target voltages.

In accordance with another aspect of the present invention, there is provided a device for preventing a latch-up phenomenon in a converter, including: a first DC-DC converter for receiving the input voltage to generate the positive voltage; a second DC-DC converter for receiving the input voltage to generate the negative voltage; and a latch-up preventing unit for controlling an input current flowing to the first DC-DC converter from an input terminal receiving the input voltage in order to prevent a latch-up phenomenon in the device.

BRIEF DESCRIPTION OF THE DRAWINGS

The above and other objects and features of the present invention will become better understood with respect to the following description of the preferred embodiments given in conjunction with the accompanying drawings, in which.

DETAILED DESCRIPTION OF THE INVENTION

A circuit for preventing latch-up in a DC-DC converter in accordance with exemplary embodiments of the present invention will be described in detail with reference to the accompanying drawings.

Figure 6:
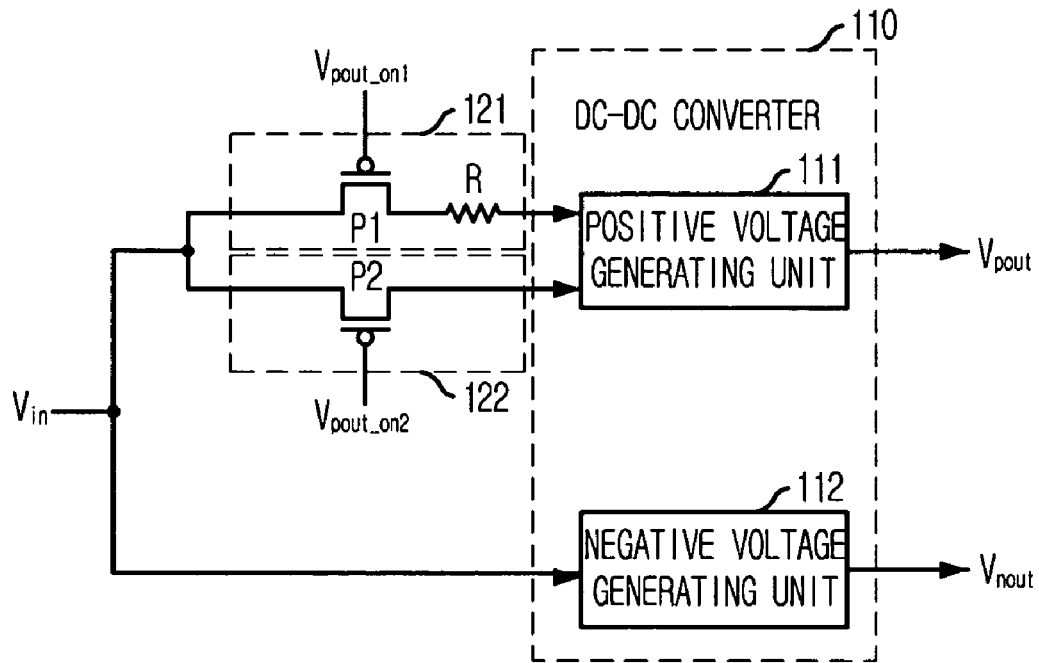
FIG. 6 is a block diagram setting forth a circuit for preventing latch-up in a DC-DC converter in accordance with a preferred embodiment of the present invention.

FIG. 6 is a block diagram setting forth a circuit for preventing latch-up in a DC-DC converter in accordance with a preferred embodiment of the present invention.

As shown, the circuit for preventing latch-up in a DC-DC converter in accordance with the preferred embodiment of the present invention includes a first pathway 121 and a second pathway 122 so as to control an input voltage VIN inputted into a positive voltage generating unit 111 (hereinafter, referred to as a first DC-DC converter). Herein, the first pathway 121 is configured with a PMOS transistor P1 and a resistor R, and the second pathway 122 is configuring with a PMOS transistor P2.

Meanwhile, since the inventive circuit is similar in constitution to the prior art except the first and the second pathways 121 and 122, further detail descriptions for the other elements will be omitted herein.

The first pathway 121 controls the current flow such that the PNP transistor Q1 is turned on and the NPN transistor Q2 is not turned on. To this end, the first pathway 121 is provided with the PMOS transistor P1 and the resistor R connected to the PMOS transistor P1 in series. The PMOS transistor P1 is operated according to a first control signal VPOUT_ON1. Herein, the first control signal VPOUT_ON1 is transited from a logic high level to a logic low level in response to a rising edge of a positive output voltage VPOUT.

The second pathway 122 controls the current to be normally supplied to the first DC-DC converter 111 after generating each of target output voltages by the first DC-DC converter 111 and a negative voltage generating unit 112 (hereinafter, referred to as a second DC-DC converter). To this end, the second pathway 122 is configured with the PMOS transistor P2. At this time, it is noticed that the PMOS transistor P2 should have a high capacity of supplying the current. The PMOS transistor P2 is operated by a second control signal VPOUT_ON2 which is transited from a logic high level to a logic low level in case that the positive and the negative output voltages VPOUT and VNOUT are outputted as the target output voltages, respectively.

Figure 7:
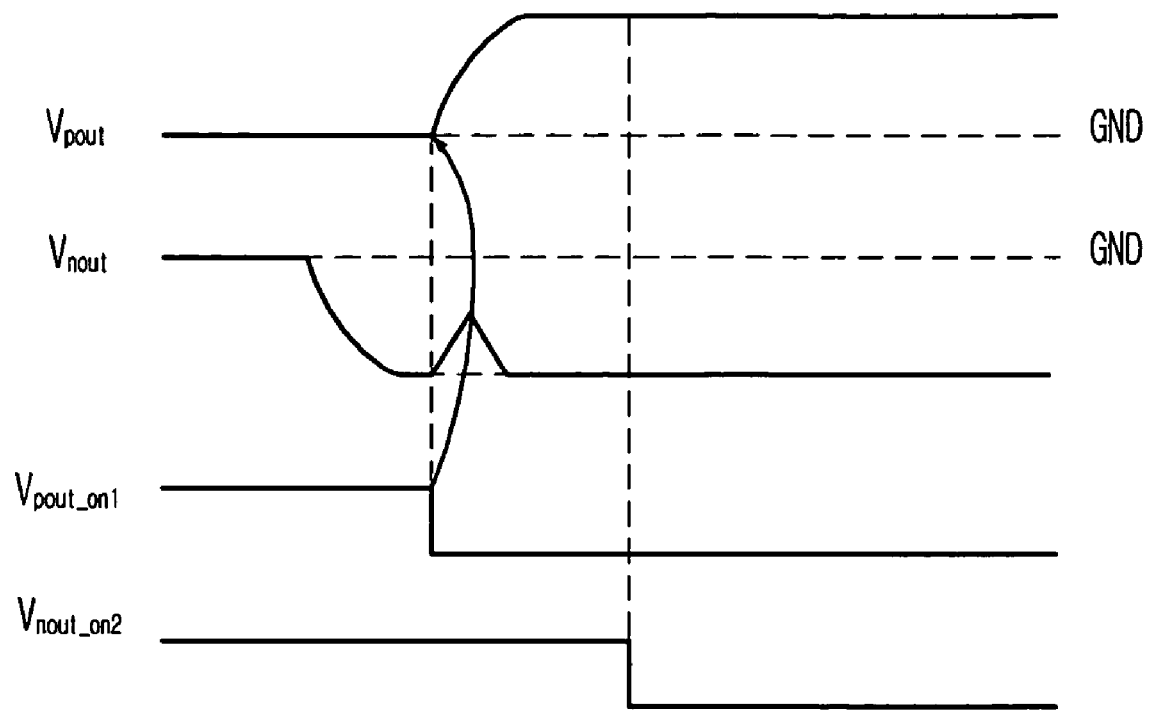
FIG. 7 is a waveform diagram illustrating the circuit for preventing the latch-up phenomenon in the DC-DC converter of FIG. 6.

An operational characteristic of the circuit for preventing the latch-up in accordance with the preferred embodiment of the present invention will be illustrated referring to FIG. 7. In addition, for the convenience of the illustration, it will be set forth with reference to FIGS. 3 and 4 which have been described already.

To begin with, the second DC-DC converter 112 receives the input voltage VIN to generate the negative output voltage VNOUT. At this time, the PMOS transistor P1 is turned on by the first control signal VPOUT_ON1 which is transited from the logic high level to the logic low level in response to the rising edge of the positive output voltage VPOUT. Accordingly, there is formed a current pathway between an input terminal and the first DC-DC converter 111. Herein, the input current is controlled to have a predetermined magnitude by the impedances of the PMOS transistor P1 and the resistor R, and then the current with the predetermined magnitude is supplied to the first DC-DC converter 111.

Figure 1:
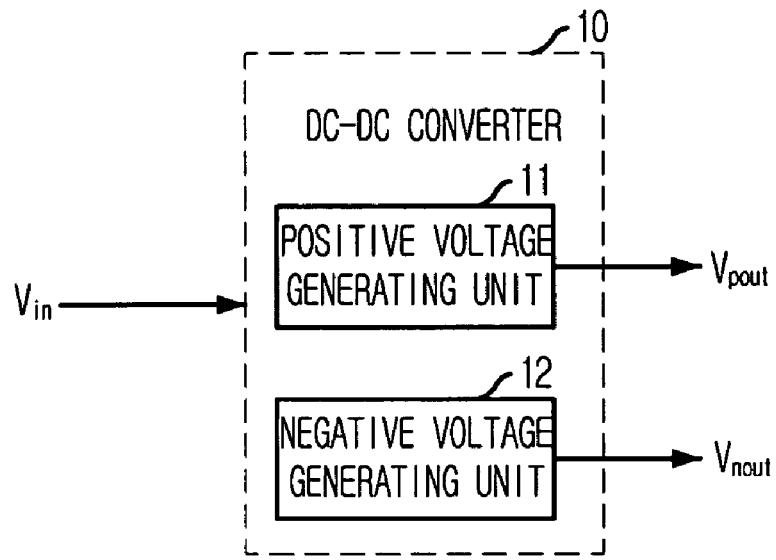
FIG. 1 is a block diagram setting forth a conventional DC-DC converter.
Figure 2:
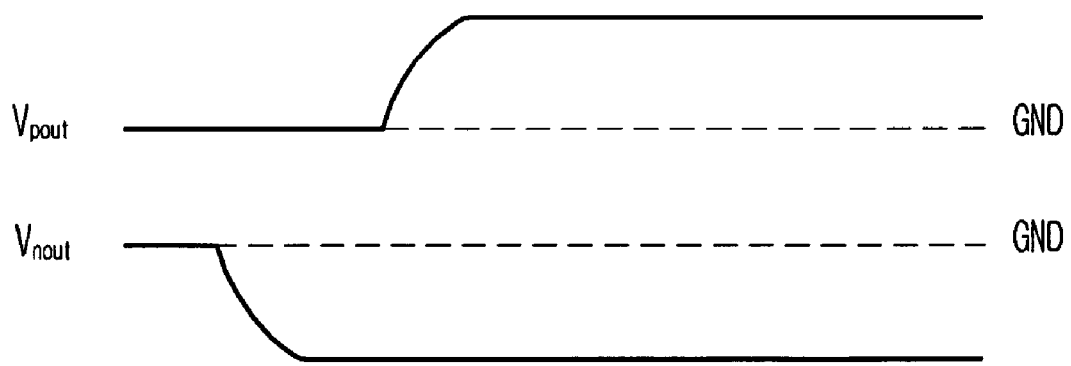
FIG. 2 is an operational waveform diagram of the DC-DC converter illustrated in FIG. 1.
Figure 3:
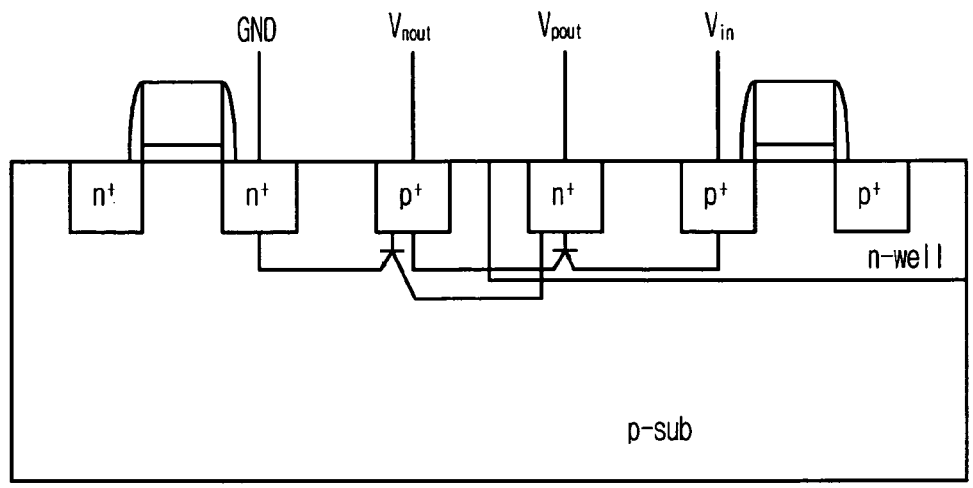
FIG. 3 is a cross sectional view setting forth a parasitic latch-up block causing latch-up in the DC-DC converter of FIG. 1.
Figure 4:
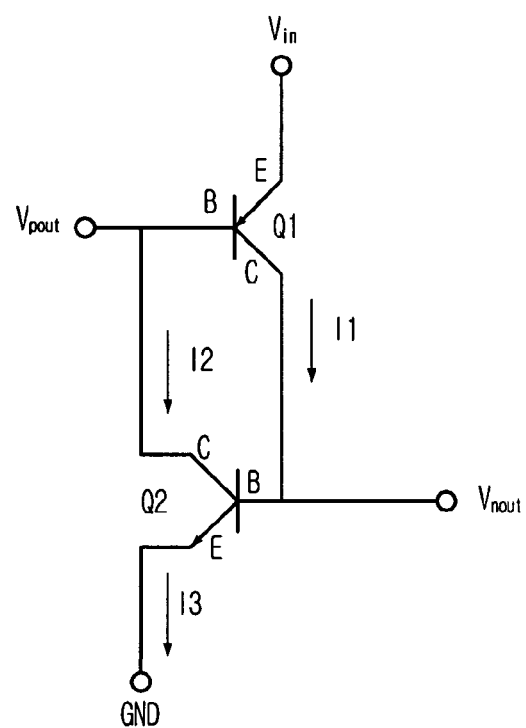
FIG. 4 is an equivalent circuit of the parasitic latch-up block of FIG. 3.
Figure 5:
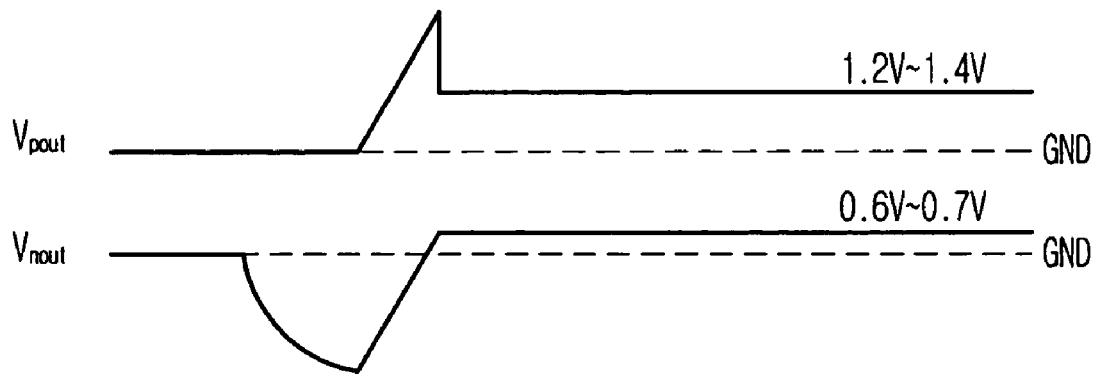
FIG. 5 is a waveform diagram representing a latch-up phenomenon occurring at the parasitic latch-up block of FIG. 3.

Thus, a forward bias is applied to a PN junction between the input terminal receiving the input voltage VIN and an output terminal for outputting the positive output voltage VPOUT (hereinafter, referred to as a first output terminal), shown in FIG. 3. Due to the forward bias, the parasitic PNP transistor Q1 is turned on, which is depicted in FIG. 4. However, since the magnitude of the current flowing into the first output terminal is controlled by the PMOS transistor P1 and the resistor R, the magnitude of the current flowing into an output terminal for outputting the negative output voltage VNOUT (hereinafter, referred to as a second output terminal) is also controlled to be a predetermined value although the parasitic transistor Q1 is turned on. That is, the current is controlled to have the magnitude within such a range that the NPN transistor Q2 is not turned on. Therefore, the negative output voltage VNOUT cannot rise up to the ground voltage GND so that the NPN transistor Q2 is still turned off.

In this state, if the positive output voltage VPOUT continuously rises up, a reverse bias is applied between the first output terminal and the input terminal so that the parasitic PNP transistor Q1 is turned off. Accordingly, the current I1 is cut off so that the negative output voltage VNOUT returns to an original voltage level.

Therefore, because the current pathway causing the latch-up phenomenon is cut off, it is possible to prevent the latch-up phenomenon.

As described above, in accordance with the present invention, one of two PN junction transistors which may cause the latch-up phenomenon is made to be turned off to cut off the current pathway in the DC-DC converter where the first and the second DC-DC converters are coupled with each other in one chip for generating the positive and the negative voltages, respectively. Therefore, it is possible to prevent the latch-up phenomenon. As a result, it is possible to enhance the operational characteristics of the device.

The present application contains subject matter related to the Korean patent application No. 2004-115903, filed in the Korean Patent Office on Dec. 30, 2004, the entire contents of which being incorporated herein by reference.

While the present invention has been described with respect to certain preferred embodiments, it will be apparent to those skilled in the art that various changes and modifications may be made without departing from the spirit and scope of the invention as defined in the following claims.

What is claimed is:

1. A circuit for preventing a latch-up phenomenon caused by a parasitic PNP bipolar junction transistor and a parasitic NPN bipolar junction transistor formed by a CMOS transistor arranged in a DC-DC converter system, the DC-DC converter system including a first DC-DC converters and a second DC-DC converter coupled with each other in one chip for receiving an input voltage for generating of a first voltage and generation of a second voltage, respectively, the circuit comprising:

a first pathway to control current supplied to the first DC-DC converter during a voltage transition during the generation of a first voltage wherein the first pathway control the magnitude of the supplied current such that more than a predetermined current is not supplied into an emitter of the parasitic PNP bipolar junction transistor formed by the CMOS transistor; and a second pathway to conduct current after the first voltage and the second voltage have reached target voltages wherein the conducted current is supplied into the emitter of the parasitic PNP bipolar junction transistor formed by the CMOS transistor.

2. The circuit as recited in claim 1, wherein the first pathway includes a first PMOS transistor turned on by a first control signal for controlling the input current to have the predetermined magnitude, the first control signal being transited from a logic high level to a logic low level in response to a rising edge of the positive voltage.

3. The circuit as recited in claim 2, wherein the first pathway further includes a resistor connected in series between the first PMOS transistor and the first DC-DC converter.

4. The circuit as recited in claim 3, wherein the second pathway includes a second PMOS transistor turned on by a second control signal for supplying the input current to the first DC-DC converter, the second control signal being at point that both first positive voltage and the negative voltage reach the target voltages.

5. A converter system for preventing a latch-up phenomenon in a converter, comprising:
   a first DC-DC converter to receive an input voltage to generate a first voltage;
   a second DC-DC converter to receive the input voltage to generate a second voltage; and
   a latch-up preventing circuit connected to the first DC-DC converter to control an input current flow in the first DC-DC converter due to the input voltage to prevent latch-up caused by a parasitic PNP bipolar junction transistor and a parasitic NPN bipolar junction transistor formed by a CMOS transistor arranged by the first DC-DC converter and the second DC-DC converter wherein the latch-up preventing circuit includes:
      a first pathway to control current supplied to the first DC-DC converter during a voltage transition during the generation of a first voltage wherein the first pathway to control the magnitude of the supplied current such that more than a predetermined current is not supplied into an emitter of the parasitic PNP bipolar junction transistor formed by the CMOS transistor; and
      a second pathway to conduct current after the first voltage and the second voltage have reached target voltages wherein the conducted current is supplied into the emitter of the parasitic PNP bipolar junction transistor formed by the CMOS transistor.

6. The system as recited in claim 5, wherein the first and the second DC-DC converter includes a parasitic PNP bipolar junction transistor and a parasitic NPN bipolar junction transistor.

7. The system as recited in claim 6, wherein the latch-up preventing circuit includes:
   a first pathway to control input current flowing to the first DC-DC converter during a voltage transition during the generation of a first voltage, the first pathway to control the magnitude of the conducting current such that the parasitic PNP bipolar junction transistor is turned on and the parasitic NPN bipolar junction transistor is not turned on; and
   a second pathway to conduct current after the first voltage and the second voltage have reached target voltages.

8. The system as recited in claim 7, wherein the first pathway includes a first transistor turned on by a first control signal for controlling the input current.

9. The system as recited in claim 8, wherein the first pathway further includes a resistor connected in series between the first transistor and the first DC-DC converter to control the magnitude of the conducting current in the first pathway.

10. The system as recited in claim 9, wherein the second pathway includes a PMOS second transistor turned on by a second control signal to supply the input current to the first DC-DC converter, the second control signal to switch on the second transistor after the first voltage and the second voltage have reached the target voltages.

* * * * *